United States Patent

Osuka et al.

(10) Patent No.: US 8,866,933 B2
(45) Date of Patent: Oct. 21, 2014

(54) IMAGING DEVICE

(75) Inventors: Kyosuke Osuka, Osaka (JP); Taizo Aoki, Hyogo (JP); Masayuki Ozaki, Osaka (JP); Wataru Okamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 56 days.

(21) Appl. No.: 13/161,505

(22) Filed: Jun. 16, 2011

(65) Prior Publication Data

US 2012/0069217 A1  Mar. 22, 2012

(30) Foreign Application Priority Data

Sep. 16, 2010 (JP) .................................. 2010-207503

(51) Int. Cl.
| | |
|---|---|
| *H04N 5/76* | (2006.01) |
| *H04N 9/82* | (2006.01) |
| *H04N 5/907* | (2006.01) |
| *H04N 5/77* | (2006.01) |
| *H04N 5/232* | (2006.01) |

(52) U.S. Cl.
CPC ............ *H04N 5/232* (2013.01); *H04N 5/23245* (2013.01); *H04N 9/8205* (2013.01); *H04N 5/907* (2013.01); *H04N 5/772* (2013.01)
USPC .................. 348/231.6; 348/333.02; 348/220.1

(58) Field of Classification Search
USPC .................. 348/231.6, 231.2, 333.01, 333.05, 348/333.02
See application file for complete search history.

(56) References Cited

U.S. PATENT DOCUMENTS

| | | | | |
|---|---|---|---|---|
| 5,806,072 | A * | 9/1998 | Kuba et al. ............................ | 1/1 |
| 6,795,116 | B1 * | 9/2004 | Akasawa ................... | 348/231.6 |
| 7,193,646 | B1 * | 3/2007 | Shioji ......................... | 348/220.1 |
| 2004/0056960 | A1 * | 3/2004 | Hayashi ................... | 348/207.99 |
| 2008/0024619 | A1 * | 1/2008 | Ono .......................... | 348/222.1 |
| 2009/0154833 | A1 * | 6/2009 | Sakaue et al. ................. | 382/282 |
| 2010/0002096 | A1 * | 1/2010 | Hong ......................... | 348/231.3 |
| 2010/0287502 | A1 * | 11/2010 | Ito et al. ........................ | 715/810 |

FOREIGN PATENT DOCUMENTS

| | | |
|---|---|---|
| JP | 5-165935 A | 7/1993 |
| JP | 2001-333361 A | 11/2001 |

* cited by examiner

*Primary Examiner* — Paul Berardesca
(74) *Attorney, Agent, or Firm* — Shinjyu Global IP

(57) ABSTRACT

An imaging device is provided that is configured to perform continuous shooting and includes an imaging unit, a memory, an imaging control unit and a grouping determination unit. The imaging unit is configured to capture an image of a subject. The memory is configured to store continuous shooting control information indicating a value of a control parameter related to continuous shooting. The imaging control unit is configured to cause the imaging unit to perform continuous shooting in accordance with the stored continuous shooting control information. The grouping determination unit is configured to determine, based on the stored continuous shooting control information, whether a series of image information are to be grouped together. The series of image information is obtained in one continuous shooting.

10 Claims, 7 Drawing Sheets

142a

Content management list

| Filename | Continuous shooting ID | Continuous shooting speed | First filename | Grouping flag | Number of images in the group |
|---|---|---|---|---|---|
| 0001 | Blank | Blank | 0001 | OFF | Blank |
| 0002 | XXX | Low | 0002 | OFF | Blank |
| 0003 | XXX | Low | 0003 | OFF | Blank |
| 0004 | YYY | High | 0004 | ON | 3 |
| 0005 | YYY | High | Blank | OFF | 3 |
| 0006 | YYY | High | Blank | OFF | 3 |

Content management list 142a

| Filename | Continuous shooting ID | Continuous shooting speed | First filename | Grouping flag | Number of images in the group |
|---|---|---|---|---|---|
| 0001 | Blank | Blank | 0001 | OFF | Blank |
| 0002 | XXX | Low | 0002 | OFF | Blank |
| 0003 | XXX | Low | 0003 | OFF | Blank |
| 0004 | YYY | High | 0004 | ON | 3 |
| 0005 | YYY | High | Blank | OFF | 3 |
| 0006 | YYY | High | Blank | OFF | 3 |

FIG. 4

IMAGING DEVICE

CROSS-REFERENCE TO RELATED APPLICATIONS

This application claims priority under 35 U.S.C. §119 to Japanese Patent Application No. 2010-207503, filed on Sep. 16, 2010. The entire disclosure of Japanese Patent Application No. 2010-207503 is hereby incorporated herein by reference.

BACKGROUND

1. Technical Field

The technology disclosed herein relates to an imaging device that is configured to continuously capture still images (hereinafter, referred to as "continuous shooting").

2. Background Information

There are known to be imaging devices that can perform continuous shooting, such as digital cameras. Continuous shooting is an operation in which an imaging device performs an imaging operation a plurality of times consecutively in response to a single user operation, thus obtaining image information for a plurality of still images. The image information for each of the still images obtained in one continuous shooting is recorded as a single file. Continuous shooting allows the user to enjoy viewing changes between captured still images, select a preferred one of the still images, and so on.

There are known to be imaging devices that can manage a series of image information obtained by continuous shooting in a grouped manner (e.g., see JP 2001-333361A). In the conventional imaging device disclosed in JP 2001-333361A, the same shooting time is assigned to a plurality of images that are obtained by continuous shooting or the like and are related to each other, thus enabling the images to be managed as an image group.

However, conventional imaging devices such as this uniformly group together a series of image information obtained in one continuous shooting. For this reason, there are cases where images cannot be grouped together in line with the user's intention.

SUMMARY

One object of the technology disclosed herein is to provide an imaging device with improved user-convenience in the management of a series of image information obtained by continuous shooting.

In accordance with aspect of the technology disclosed herein, an imaging device is provided that is configured to perform continuous shooting and includes an imaging unit, a memory, an imaging control unit and a grouping determination unit. The imaging unit is configured to capture an image of a subject. The memory is configured to store continuous shooting control information indicating a value of a control parameter related to continuous shooting. The imaging control unit is configured to cause the imaging unit to perform continuous shooting in accordance with the stored continuous shooting control information. The grouping determination unit is configured to determine, based on the stored continuous shooting control information, whether a series of image information are to be grouped together. The series of image information is obtained in one continuous shooting.

These and other objects, features, aspects and advantages of the technology disclosed herein will become apparent to those skilled in the art from the following detailed description, which, taken in conjunction with the annexed drawings, discloses embodiments of the present invention.

BRIEF DESCRIPTION OF THE DRAWINGS

Referring now to the attached drawings which form a part of this original disclosure:

FIG. 4 shows an example of a content management list of the digital camera 100 according to Embodiment 1;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

A digital camera 100 of the First Embodiment can perform continuous shooting. When performing continuous shooting in an imaging mode, the digital camera 100 performs imaging at a continuous shooting speed that has been set in advance. In the case of reproduction, the digital camera 100 determines whether or not recorded images are to be reproduced in a grouped manner based on information indicating the continuous shooting speed. Below is a description of a configuration and operations of the digital camera 100 with reference to the drawings.

1. Configuration of Digital Camera 100

Figure 1:
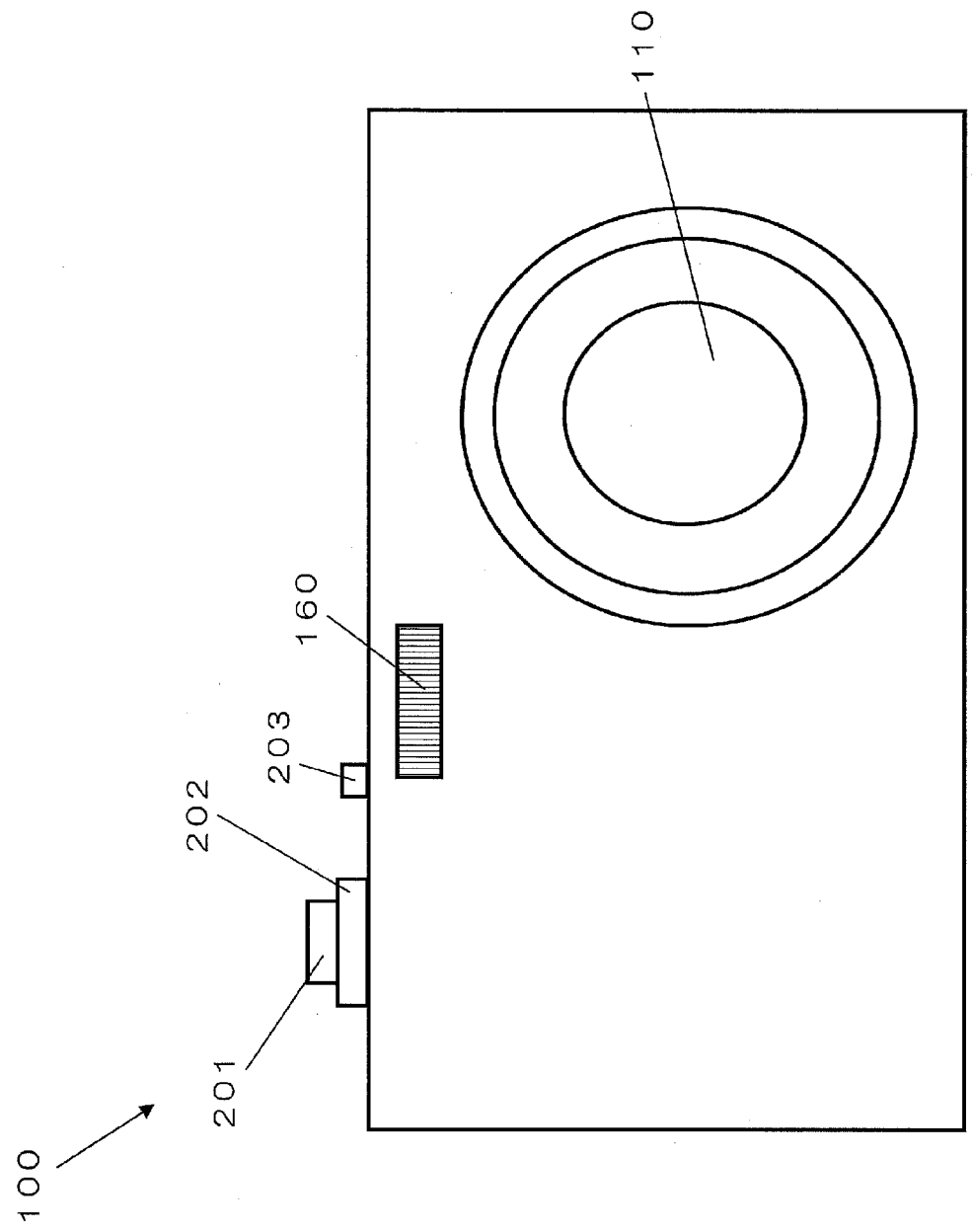
FIG. 1 is a front view of a digital camera 100 according to Embodiment 1.

As shown in FIG. 1, on its front face, the digital camera 100 includes a flash 160 and a lens barrel housing an optical system 110. On its top face, the digital camera 100 includes an operation unit 150 that has a still image release button 201, a zoom lever 202, a power button 203, and the like.

Figure 2:
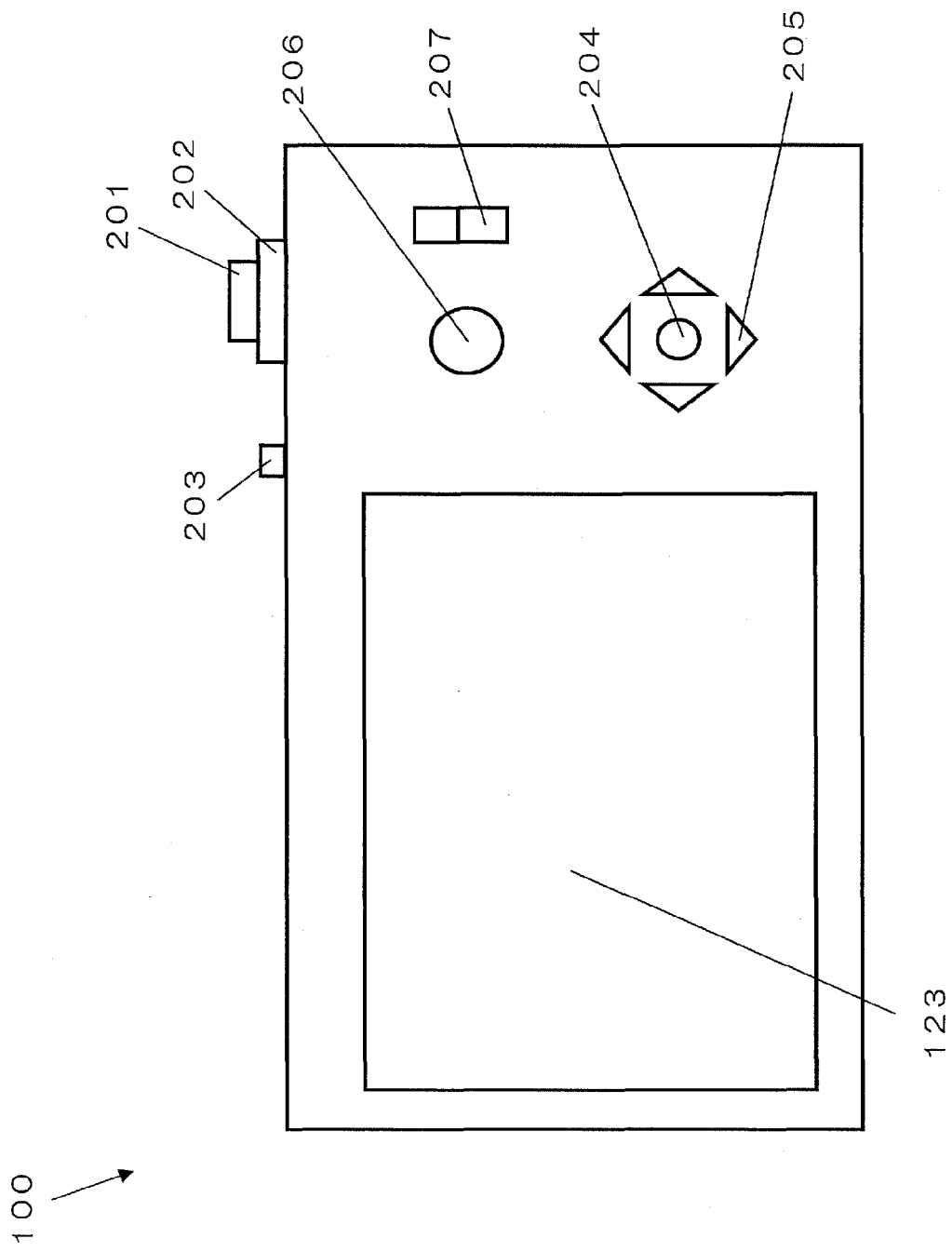
FIG. 2 is a back view of the digital camera 100 according to Embodiment 1.

As shown in FIG. 2, on its back face, the digital camera 100 includes a liquid crystal monitor 123 and the operation unit 150, which has a center button 204, a directional button pad 205, a video release button 206, a mode switching switch 207, and the like.

Figure 3:
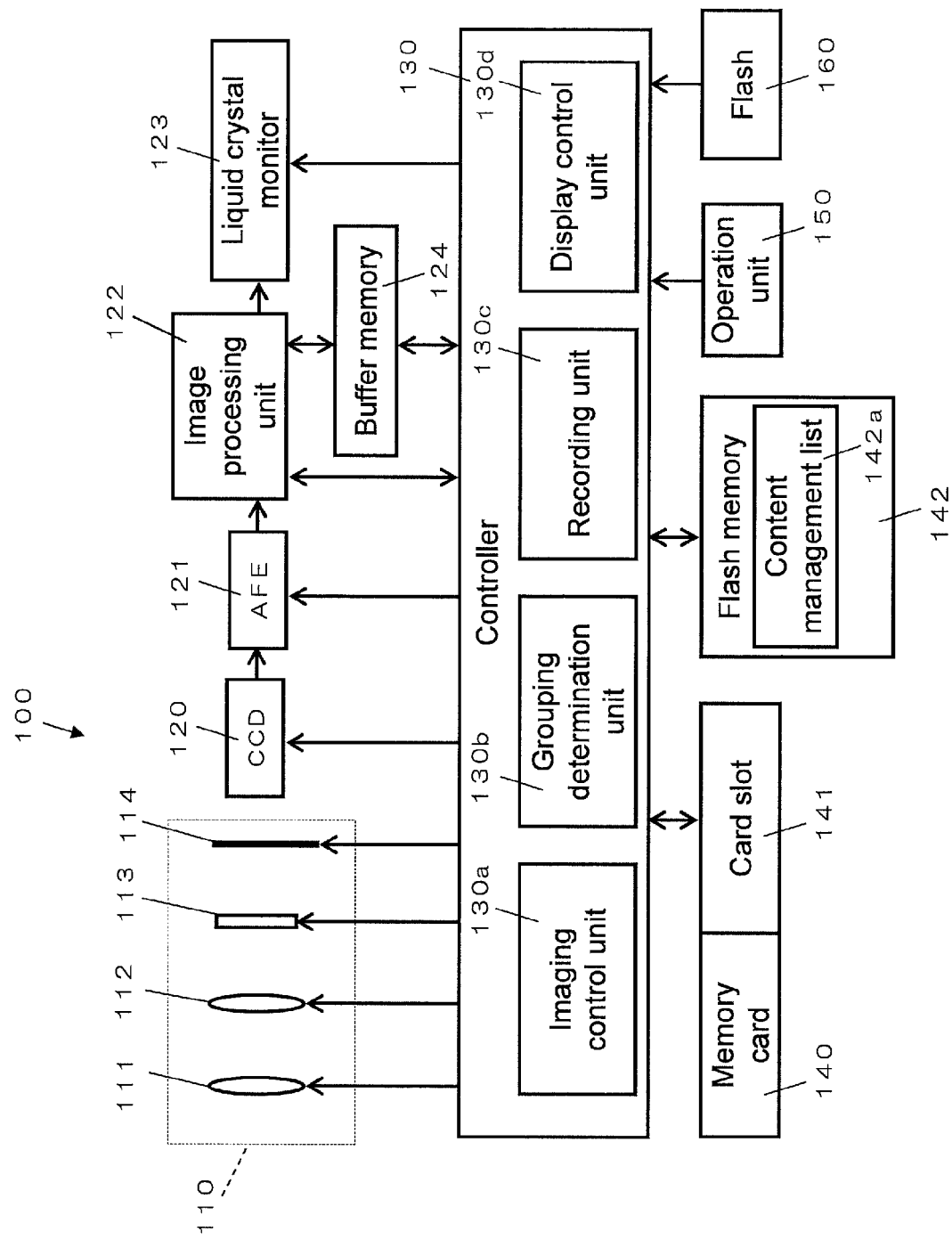
FIG. 3 is a block diagram showing an electrical configuration of the digital camera 100 according to Embodiment 1.

As shown in FIG. 3, the digital camera 100 includes the optical system 110, a CCD image sensor 120, an AFE (Analog Front End) 121, an image processing unit 122, a buffer memory 124, the liquid crystal monitor 123, a controller 130, a card slot 141, a memory card 140, a flash memory 142, the operation unit 150, and the flash 160.

The CCD image sensor 120 captures a subject image formed via the optical system 110. The CCD image sensor 120 then generates image information expressing the captured subject image. The image information generated by the CCD image sensor 120 is subjected to various types of processing by the AFE 121 and the image processing unit 122, and thereafter recorded to the flash memory 142 and/or the memory card 140. Note that an image that has been captured by the CCD image sensor 120 and thereafter recorded to the flash memory 142 and/or the memory card 140 will hereinafter be referred to as a "recorded image". For the sake of simplicity, the recorded image is described as being recorded on the memory card 140. The recorded image recorded on the memory card 140 is displayed on the liquid crystal monitor 123 when the operation unit 150 receives a predetermined operation from a user. The following describes details of the various units shown in FIGS. 1 to 3.

The optical system 110 has a focusing lens 111, a zoom lens 112, an aperture 113, and a shutter 114. Although not shown, the optical system 110 may include an OIS (Optical Image Stabilizer), which is an optical camera shake correction lens. Each of lenses included in the optical system 110 may be configured by a certain number of lenses, or may be configured by a certain number of groups of lenses.

The focusing lens 111 adjusts the focus state of the subject. The zoom lens 112 adjusts the angle of view of the subject. The aperture 113 adjusts the amount of light that is incident on the CCD image sensor 120. The shutter 114 adjusts the exposure time of light that is incident on the CCD image sensor 120. The focusing lens 111, the zoom lens 112, the aperture 113, and the shutter 114 are each driven by a driving unit (not shown) such as a DC motor or a stepping motor in accordance with control signals from the controller 130.

The CCD image sensor 120 includes a plurality of pixels. The CCD image sensor 120 captures a subject image formed through the optical system 110 and generates image information expressing the captured subject image. When the digital camera 100 is in the imaging mode, the CCD image sensor 120 can generate a new frame of image information at a certain time interval.

The AFE 121 performs various types of processing on image information read out from the CCD image sensor 120. Specifically, the AFE 121 performs processing such as noise suppression through correlated double sampling, amplification to the input range amplitude of an A/D converter through an analog gain controller, and A/D conversion through the A/D converter. Thereafter, the AFE 121 outputs the image information subjected to various types of processing to the image processing unit 122.

The image processing unit 122 subjects the image information output from the AFE 121 to various types of processing such as smear correction, white balance correction, gamma correction, YC conversion processing, electronic zooming processing, reduction processing, and compression processing. Also, when recorded image information on the memory card 140 is to be reproduced, the image processing unit 122 performs various types of processing such as expansion processing on the recorded image information. The image processing unit 122 stores the image information subjected to the various types of processing in the buffer memory 124. The image processing unit 122 may be a hard-wired electronic circuit, or may be a microcomputer that executes a program. The image processing unit 122 may be configured integrally with the controller 130 and the like. For example, the image processing unit 122 may be mounted on the same semiconductor chip as the controller 130 and the like.

The liquid crystal monitor 123 displays an image corresponding to image information that was subjected to the various types of processing by the image processing unit 122. Examples of images to be displayed on the liquid crystal monitor 123 include a through-the-lens image and a reproduction image. A through-the-lens image is a frame image that is newly generated at a certain time interval by the CCD image sensor 120. Normally, the CCD image sensor 120 generates through-the-lens image information while the digital camera 100 is in the imaging mode. The image processing unit 122 performs the above-described predetermined processing on the generated through-the-lens image information. The liquid crystal monitor 123 displays a through-the-lens image based on the through-the-lens image information subjected to the above-described predetermined processing. The user can capture an image of a subject while checking the subject composition by referencing the through-the-lens images displayed on the liquid crystal monitor 123.

A reproduction image is an image corresponding to low pixel-count image information obtained by the image processing unit 122 reducing high pixel-count recorded image information in conformity with the size of the liquid crystal monitor 123 while the digital camera 100 is in a reproduction mode. Note that high pixel-count recorded image information is generated by the image processing unit 122 based on image information generated by the CCD image sensor 120, after the user has performed a predetermined operation on the still image release button 201 or the video release button 206.

The controller 130 performs collective control of overall operations of the digital camera 100. After image information has been subjected to various types of processing by the image processing unit 122 and stored in the buffer memory 124, the controller 130 records the image information on the memory card 140. The controller 130 has a ROM that stores information such as programs, and a CPU that processes various types of information by executing the programs. The ROM stores programs related to file control, auto focus control (AF control), auto exposure control (AE control), and operation control of the flash 160, as well as a program for performing collective control of overall operations of the digital camera 100. Through the CPU reading out and executing the programs stored on the ROM, the controller 130 operates as an imaging control unit 130a, a grouping determination unit 130b, a recording unit 130c, a display control unit 130d, and the like. Details of the operations of the units 130a to 130d will be described later.

The controller 130 may be a hard-wired electronic circuit, or may be a microcomputer that executes a program. The ROM may be incorporated inside the controller 130, or may exist outside the controller 130 (separately from the CPU).

The buffer memory 124 is a storage medium that functions as a work memory for the image processing unit 122 and the controller 130. The buffer memory 124 can be implemented with a DRAM (Dynamic Random Access Memory) or the like.

The flash memory 142 functions as an internal memory for recording image information and the like. The flash memory 142 stores a content management list 142a shown in FIG. 4. The flash memory 142 also stores information indicating the values of various control parameters related to the operation of the digital camera 100. The various control parameters related to the operation of the digital camera 100 include various later-described control parameters related to continuous shooting. Imaging conditions and reproduction conditions of the digital camera 100 are determined by the values of the control parameters of the digital camera 100. The imaging conditions and the reproduction conditions are set by the user on a menu screen that will be described later. Included among the control parameters of the digital camera 100 are control parameters directly set by the user on the menu screen, control parameters determined in conjunction with a value of another setting item that has been directly set by the user on the menu screen, and control parameters determined in conjunction with a condition that has not be set by the user (e.g., the imaging environment). Information indicating the values of the control parameters of the digital camera 100 are copied from the flash memory 142 to the buffer memory 124 as appropriate.

The content management list 142a is referenced by the controller 130. The content management list 142a is used for determining a recorded image that is to be reproduced if the reproduction of recorded images by group display has been designated. In group display in the present embodiment, for each grouped series of recorded images, only one representative image included in the series of recorded images is displayed on the liquid crystal monitor 123 (more precisely, a reproduction image is displayed based on the representative image), and the display of the recorded images other than the representative image is omitted. In the group display, non-grouped recorded images are also displayed individually on the liquid crystal monitor 123.

Although details will be given later, the digital camera 100 can perform "single shooting" and "continuous shooting" as still image imaging operations. Performing single shooting one time obtains image information for one still image as a recorded image. Performing continuous shooting one time obtains image information for a plurality of still images as recorded images. The continuous shooting speed, which is a control parameter related to "continuous shooting", can be set in the digital camera 100. The continuous shooting speed is the number of images captured per second when continuous shooting is performed. The content management list 142a includes a "filename" filed, a "continuous shooting ID" field, a "continuous shooting speed" field, a "first filename" field, and a "grouping flag" field. Records in the content management list 142a are in one-to-one correspondence with recorded images. For the sake of simplicity, the recorded images managed by the content management list 142a are all assumed to be still images in the description given below.

Stored in the "filename" field are the filenames of recorded image information that is recorded on the memory card 140. The filenames are used for specifying recorded images. In the present embodiment, a four-digit number is assigned as the filename of the image file of each still image that has been captured by single shooting or continuous shooting.

Stored in the "continuous shooting ID" field is information for specifying image information captured in the same continuous shooting (hereinafter, referred to as a "continuous shooting ID"). The same continuous shooting ID is set for a series of recorded image information captured in one continuous shooting. Although the continuous shooting ID is created from time data obtained from the imaging date/time in the present embodiment, the continuous shooting ID can be created by another arbitrary method in another embodiment. Also, in the present embodiment, the "continuous shooting ID" field is blank in a record corresponding to an image captured by single shooting. However, in another embodiment, an arbitrary value that enables determining that an image is not an image captured by continuous shooting can be stored in the "continuous shooting ID" field of a record corresponding to an image captured by single shooting.

Information indicating the continuous shooting speed that was set in the digital camera 100 at the time of imaging is set in the "continuous shooting speed" field. Specifically, in the present embodiment, in accordance with the continuous shooting speed setting of the digital camera 100, either "low", "medium", or "high" is set in the "continuous shooting speed" field of a record corresponding to a recorded image captured by continuous shooting. Also, in the present embodiment, the "continuous shooting speed" field is blank in a record corresponding to a recorded image captured by single shooting. However, in another embodiment, an arbitrary value that enables determining that an image is not an image captured by continuous shooting can be stored in the "continuous shooting speed" field of a record corresponding to an image captured by single shooting.

Stored in the "first filename" field are the filenames of recorded image information that is to be displayed in the case where the reproduction of recorded images by group display has been designated. When reproducing recorded images by group display, the digital camera 100 displays each image captured by single shooting, and displays each of images that were captured by continuous shooting but not grouped together. However, when reproducing recorded images by group display, in the case of reproducing a series of images that were captured in one continuous shooting and were grouped together, the digital camera 100 displays the first (first captured) image among the grouped series of images. Accordingly, the first filename is managed by the digital camera 100. The "filename" for each image captured by single shooting and each of images that were captured by continuous shooting but not grouped together is set as the "first filename". Also, the "filename" of the first image among each series of images that were captured in one continuous shooting and grouped together is set as the "first filename".

Stored in the "grouping flag" field of each record is a flag for indicating that the recorded image corresponding to the record is the first image among grouped recorded images. Here, "ON" is set in the "grouping flag" field of records corresponding to such images (the first images among grouped recorded images), and "OFF" is set in the "grouping flag" field of records corresponding to other images.

In the example in FIG. 4, the file with the filename "0001" is the image data of a recorded image captured by single shooting. In the case of a single shooting image, the same filename is set in "filename" and "first filename" fields, and "OFF" is set in the "grouping flag" field. Also, the files with the filenames "0002" and "0003" are the image data of recorded images captured in the same continuous shooting at the "low" continuous shooting speed. Similarly to the case of single shooting, the recorded images corresponding to the filenames "0002" and "0003" are not grouped together.

On the other hand, the files with the filenames "0004", "0005", and "0006" are the image data of recorded images captured in the same continuous shooting at the "high" continuous shooting speed. The series of recorded images corresponding to the filenames "0004", "0005", and "0006" are displayed in a grouped manner during reproduction.

The creation and updating of the content management list 142a will be described later.

The card slot 141 is a connection unit to/from which the memory card 140 can be attached/removed. The memory card 140 can be electrically and mechanically connected to the card slot 141. In the present embodiment, the card slot 141 includes a function for controlling the memory card 140.

The memory card 140 is an external memory that has a built-in storage medium such as a flash memory. The memory card 140 can record data such as image information subjected to various processing by the image processing unit 122.

The operation unit 150 is a collective name for operation buttons, operation dials, and operation levers arranged on the exterior of the digital camera 100. The operation unit 150 receives a user operation performed thereon. For example, the operation unit 150 includes the still image release button 201, the video release button 206, the zoom lever 202, the power button 203, the center button 204, the directional button pad 205, the mode switching switch 207, and the like that are shown in FIGS. 1 and 2. When the user performs operations on the operation unit 150, the operation unit 150 notifies the controller 130 of signals instructing various operations.

The still image release button 201 is a depression-type button for instructing the timing of still image recording. The still image release button 201 transitions between two stages, namely a half-pressed state and a fully-pressed state. If the still image release button 201 is half-pressed by the user, the controller 130 executes AF (Auto Focus) control and/or AE (Auto Exposure) control, and the like, and determines imaging conditions. If the still image release button 201 is then fully-pressed by the user, the controller 130 records on the memory card 140 image information for the still image captured when the button was fully-pressed. Hereinafter, when the still image release button 201 is described as simply being pressed, it is to be assumed that the button is fully-pressed.

The video release button 206 is a depression-type button for instructing the start timing and the end timing of video recording. If the video release button 206 has been pressed by the user, the controller 130 sequentially records, on the memory card 140, video image information generated by the CCD image sensor 120 and the image processing unit 122. If the video release button 206 is pressed again by the user, the video recording ends.

The zoom lever 202 is a lever for adjusting the angle of view between a wide angle side and a telescopic side. The zoom lever 202 is a self-resetting type of lever that automatically returns to the center position when the user has stopped performing an operation thereon. If the user operates the zoom lever 202, the zoom lever 202 notifies the controller 130 of a signal instructing the driving of the zoom lens 112. Specifically, if the user moves the zoom lever 202 toward the wide angle side, the controller 130 drives the zoom lens 112 such that subject image is viewed at a wide angle. Similarly, if the user moves the zoom lever 202 toward the telescopic side, the controller 130 drives the zoom lens 112 such that subject image is viewed at a telescopic angle.

The power button 203 is a depression-type button for turning on and off the supply of power to various units of the digital camera 100. If the user presses the power button 203 while the power is off, the controller 130 activates various units of the digital camera 100 by supplying power thereto. If the user presses the power button 203 while the power is on, the controller 130 stops the supply of power to various units of the digital camera 100.

The center button 204 is a depression-type button. If the user presses the center button 204 while the digital camera 100 is in the imaging mode or the reproduction mode, the controller 130 causes the liquid crystal monitor 123 to display a menu screen. The menu screen is a screen for allowing the user to set various imaging conditions and reproduction conditions. If the user presses the center button 204 while a value of a setting item related to any of various conditions is selected on the menu screen, that value is determined for that setting item.

The directional button pad 205 is a depression-type button that has four pressing sites provided in the upward, downward, leftward, and rightward directions. By appropriately pressing the pressing sites of the directional button pad 205, the user can select the value of a control parameter of various conditions displayed on the menu screen.

The mode switching switch 207 is a depression-type button that has two pressing sites provided in the upward and downward directions. By appropriately pressing the pressing sites of the mode switching switch 207, the user can switch the state of the digital camera 100 between the imaging mode and the reproduction mode.

Note that the CCD image sensor 120 is an example of the imaging unit. The imaging control unit 130a is an example of the imaging control unit. The grouping determination unit 130b is an example of the grouping determination unit. The recording unit 130c is an example of the recording unit. The display control unit 130d is an example of the display control unit. The flash memory 142 and the buffer memory 124 are examples of the memory. The liquid crystal monitor 123 is an example of the display unit. The memory card 140 is an example of the storage.

2. Operations

Below is a description of operations of the digital camera 100.

2-1. Continuous Shooting Mode Setting

The following describes operations for setting continuous shooting in the imaging mode. By operating the operation unit 150, the user can select and set "single shooting" or "continuous shooting" as the imaging way of the digital camera 100. In the case of "single shooting", when the user presses the still image release button 201 of the digital camera 100 one time, the imaging operation is performed one time, thus obtaining one recorded image. In the case of "continuous shooting", when the user presses the still image release button 201 one time, the imaging operation is performed a plurality of times, thus obtaining a plurality of recorded images. In the present embodiment, "continuous shooting" continues while the user is pressing the still image release button 201, and ends in accordance with the user canceling the pressing of the still image release button 201. As an attribute of "continuous shooting", the user can set the continuous shooting speed by operating the operation unit 150. The continuous shooting speed is the number of images captured per second when continuous shooting is performed. When the continuous shooting speed is fast, the interval between operations for capturing recorded images in continuous shooting is short, and when the continuous shooting speed is slow, the interval between operations for capturing recorded images in continuous shooting is long. In the present embodiment, the continuous shooting speed can be selected from among three levels of speed, namely low-speed, medium-speed, and high-speed.

In the present embodiment, the user can switch between "continuous shooting" and "single shooting" and set the continuous shooting speed on the menu screen displayed on the liquid crystal monitor 123 by operating the operation unit 150. However, in another embodiment, a configuration is possible in which, for example, the operation unit 150 includes a dedicated button or switch that enables selecting either "single shooting", "continuous shooting (low-speed)", "continuous shooting (medium-speed)", or "continuous shooting (high-speed)". In the following description, according to the above-described configuration, either "single shooting", "continuous shooting (low-speed)", "continuous shooting (medium-speed)", or "continuous shooting (high-speed)" is selected as the continuous shooting setting.

2-2. Creation of Content Management List

The following describes content management list creation processing. The content management list creation processing is processing for creating the content management list 142a. The content management list 142a is used for determining images to be displayed by the liquid crystal monitor 123 when reproducing recorded images by group display. In order to improve image viewability, the digital camera 100 receives the instruction of recorded image reproduction by group display from the user. In the digital camera 100, of images captured by continuous shooting, only images captured at high-speed continuous shooting speed are grouped together.

If the user inserts the memory card 140 into the digital camera 100 while the power is on, or if the user turns the power on by pressing the power button 203 while the memory card 140 is inserted in the digital camera 100, the grouping determination unit 130b starts the content management list creation processing. Of image information captured by continuous shooting, the grouping determination unit 130b only groups together image information captured by high-speed continuous shooting.

If recorded images to be grouped together are to be determined for the first time when an instruction to reproduce recorded image information stored on the memory card 140 by group display has been received, it is possible that a long amount of time will be required to determine the recorded images that are to be reproduced by group display.

Figure 5:
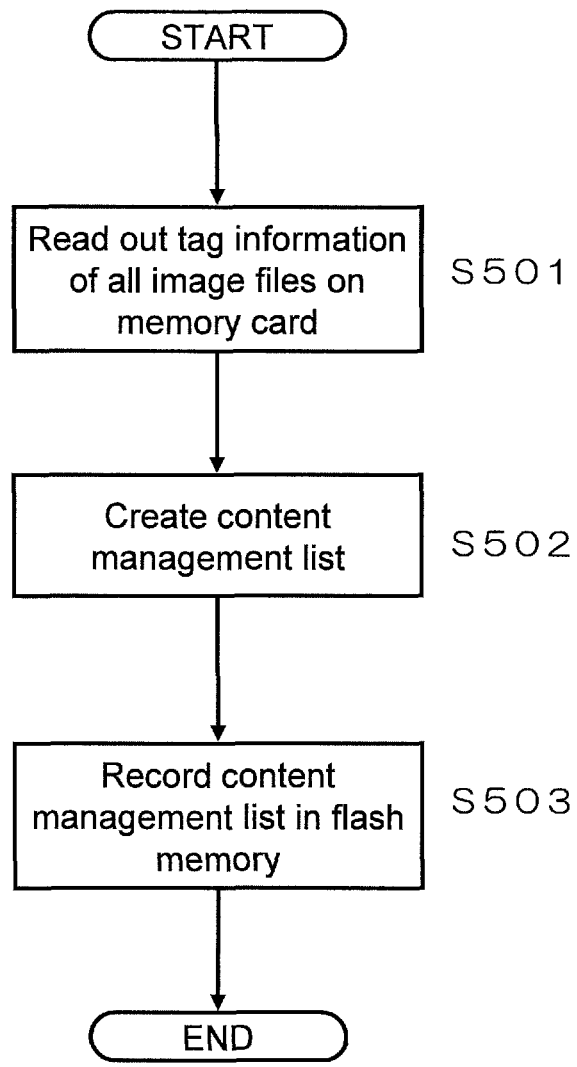
FIG. 5 is a flowchart showing content management list creation processing performed by the digital camera 100 according to Embodiment 1.

In view of this, it is preferable that the grouping determination unit 130b creates the content management list 142a when the memory card 140 is inserted or when the power is turned on (FIG. 5). The grouping determination unit 130b creates the content management list 142a by reading out tag information of the recorded image information (image files) on the memory card 140 one-by-one, and checking based on the readout tag information whether the recorded image information is an image information targeted for grouping.

The tag information of recorded image information (an image file) is stored in a data storage area that is defined by the EXIF standard and can be used proprietarily by the manufacturer. During imaging, the tag information of recorded image information is made into a file together with the recorded image information itself and other information based on the EXIF standard, and the resulting file is recorded.

As information related to continuous shooting, the tag information includes information about the continuous shooting speed and the continuous shooting ID and the like. A configuration is possible in which the tag information includes, as information for determining whether the recorded image information is to be grouped, information related to at least one of the following: the number of images captured in one continuous shooting, the shutter pressed time (the time period from when the still image release button 201 was pressed to instruct the start of continuous shooting until when the pressing of the still image release button 201 was canceled to instruct the end of continuous shooting), and whether pixel mixing was performed in the image information output from the CCD image sensor 120.

The content management list creation processing is executed by the grouping determination unit 130b in accordance with the following procedure (see the flowchart of FIG. 5).

1) The grouping determination unit 130b reads out the filenames of the images files of all the recorded images from the management information on the memory card 140. The grouping determination unit 130b also reads out the continuous shooting IDs and the continuous shooting speeds from the tag information of the image files of all the recorded images (S501).

2) The grouping determination unit 130b updates the content management list 142a by executing the following processes (A) to (C) on the image file of each recorded image (S502).

(A) The grouping determination unit 130b adds an entry (record) related to the image file of the currently targeted recorded image, as a new entry at the end of the content management list 142a. The grouping determination unit 130b sets values in the "filename", "continuous shooting ID", and "continuous shooting speed" fields of this entry in accordance with the information readout in process (1) of the procedure.

(B) If the currently targeted recorded image satisfies a predetermined condition, the grouping determination unit 130b searches for the image file of a predetermined recorded image within a predetermined search range. The predetermined condition is satisfied if the tag information of the image file of the currently targeted recorded image includes a continuous shooting ID, and furthermore the continuous shooting speed included in the tag information is "high-speed". The predetermined recorded image is a recorded image that has been assigned the same continuous shooting ID as the image file of the currently targeted recorded image. The predetermined search range is the range from the first entry in the content management list 142a to the entry of the image file of the currently targeted recorded image.

(C) If as the result of process (B), the predetermined condition is satisfied, but the file that was searched for does not exist, the grouping determination unit 130b determines that currently targeted recorded image is the first image in a series of images captured by continuous shooting. Subsequently, the grouping determination unit 130b sets the filename of the image file of the currently targeted recorded image in the "first filename" field. The grouping determination unit 130b also sets "ON" in the "grouping flag" field. If as a result of process (B), the predetermined condition is satisfied, and furthermore the file being searched for exists, the grouping determination unit 130b causes the "first filename" field to be blank, and sets "OFF" in the "grouping flag" field. Further, if as a result of process (B), the predetermined condition is not satisfied, the grouping determination unit 130b sets the filename of the image file of the currently targeted recorded image in the "first filename" field. The grouping determination unit 130b also sets "OFF" in the "grouping flag" field.

3) After executing processes (1) and (2), the grouping determination unit 130b writes the content management list 142a to the flash memory 142 (S503).

According to the above processing, the content management list 142a is created to be used in the reproduction of recorded image information. Note that the content management list 142a may be written to the memory card 140.

From a different point of view, in the above-described processes (B) and (C), the grouping determination unit 130b determines whether a series of image information captured in one continuous shooting is to be grouped together based on information indicating the value of the continuous shooting speed. Also, information indicating the result of the determination made by the grouping determination unit 130b is stored in the content management list 142a.

2-3. Operations in Continuous Shooting

If the user presses the mode switching switch 207 in the imaging mode direction while the power of the digital camera 100 is on, the controller 130 switches the state of the digital camera 100 to the imaging mode by controlling various units therein. In the imaging mode, the imaging control unit 130a causes the CCD image sensor 120 to output through-the-lens image information by performing the imaging operation at a predetermined interval. Subsequently, the AFE 121 and the image processing unit 122 sequentially perform predetermined processing on the through-the-lens image information output from the CCD image sensor 120. The display control unit 130d causes the liquid crystal monitor 123 to display through-the-lens images based on the through-the-lens image information output from the image processing unit 122. Note that in the imaging mode, the state in which the digital camera 100 can receive a user operation while displaying through-the-lens images is referred to as the "standby state".

The user can perform setting related to continuous shooting by operating the operation unit 150. The controller 130 stores the content of the setting related to continuous shooting (either "single shooting", "continuous shooting (low-speed)", "continuous shooting (medium-speed)", or "continuous shooting (high-speed)") in the buffer memory 124. After finishing the setting related to continuous shooting, the user can determine the image composition while viewing the through-the-lens images, and performs imaging by continuous shooting.

Figure 6:
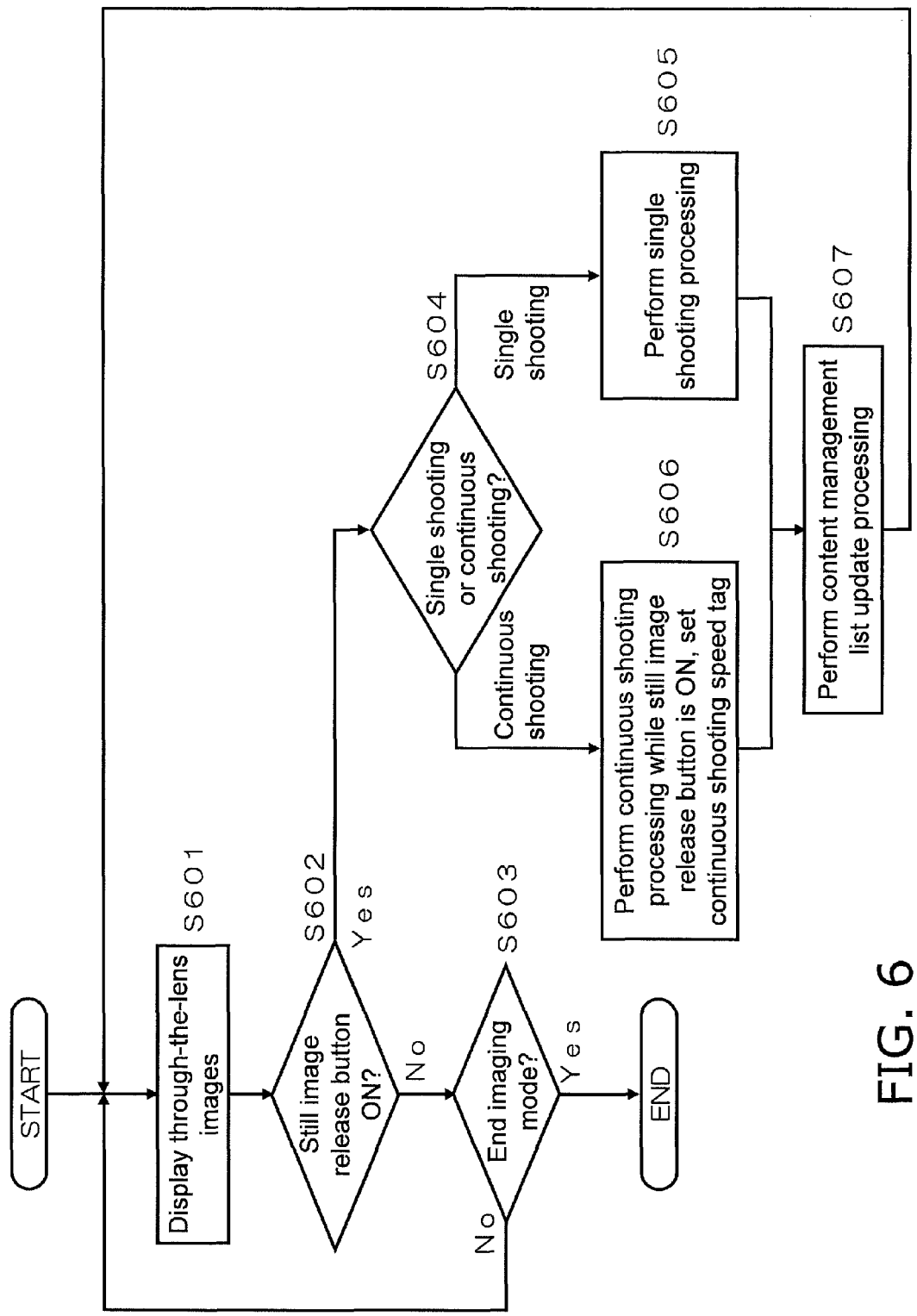
FIG. 6 is a flowchart showing processing performed in an imaging mode by the digital camera 100 according to Embodiment 1.

The following is a description of continuous shooting operations performed by the digital camera 100 in the imaging mode. FIG. 6 is a flowchart showing imaging operations performed by the digital camera 100 in the imaging mode.

In the imaging mode, the imaging control unit 130a causes the CCD image sensor 120 to output through-the-lens image information. The through-the-lens image information is subjected to various types of processing and then sent to the liquid crystal monitor 123. The display control unit 130d causes the liquid crystal monitor 123 to display through-the-lens images corresponding to the through-the-lens image information that was sent to the liquid crystal monitor 123 (S601).

Next, the controller 130 determines whether the still image release button 201 has been pressed (S602). Upon determining that the still image release button 201 has not been pressed, that is to say, the user has not released the shutter 114 ("No" in S602), the controller 130 determines whether the imaging mode is to be ended (S603). The determination as to whether the imaging mode is to be ended is made based on whether the mode switching switch 207 has been operated, the power button 203 has been pressed, or the like. Upon determining that the imaging mode is to be ended ("Yes" in S603), the controller 130 ends operations in the imaging mode. On the other hand, upon determining that the imaging mode is to be continued rather than ended ("No" in S603), the controller 130 returns to the processing of step S601. In this way, in the imaging mode, the imaging operation is performed at a predetermined interval, and through-the-lens image corresponding to image information obtained as a result of the imaging operation is displayed.

If the user determines the image composition and presses the still image release button 201, the controller 130 determines that the still image release button 201 has been pressed ("Yes" in S602). The controller 130 then reads out the content of the continuous shooting setting stored in the buffer memory 124, and determines the setting content (S604).

If the continuous shooting setting is "single shooting" ("single shooting" in S604), the controller 130 performs the single shooting operation by controlling various units (S605). Specifically, the imaging control unit 130a causes the CCD image sensor 120 to perform single shooting. As the single shooting imaging operation, the CCD image sensor 120 outputs image information for one still image. The image information is subjected to various types of processing, and thereafter recorded on the memory card 140 in an image file format by the recording unit 130c. The filename of the image file is assigned by the recording unit 130c.

Next, the grouping determination unit 130b updates the content management list 142a, which is necessary when reproducing recorded image information by group display (S607). When updating the content management list 142a after single shooting, the grouping determination unit 130b adds an entry for one recorded image obtained by single shooting to the end of the list. The filename of the image file of the one recorded image obtained by the immediately previous single shooting is set in the "filename" and "first filename" fields of this entry. The "continuous shooting ID" and "continuous shooting speed" fields of this entry are caused to be blank. Also, "OFF" is set in the "grouping flag" field of this entry. The controller 130 then causes current reproduction content information to conform to the recorded image that was last recorded (or if the recorded image that was last recorded is an image among a series of images captured by high-speed continuous shooting, the current reproduction content information is caused to conform to the first image in the series). The reproduction content information is information specifying the recorded image that is to be reproduced first when the state of the digital camera 100 is switched to the reproduction mode. Specifically, the reproduction content information is the filename of the image file of the recorded image to be reproduced first.

After the content management list update processing (S607) has been performed, the procedure returns to step S601, and the digital camera 100 resumes the display of through-the-lens images.

On the other hand, upon determining that the continuous shooting setting content is "continuous shooting (low-speed)", "continuous shooting (medium-speed)", or "continuous shooting (high-speed)", that is to say, a setting for performing continuous shooting ("continuous shooting" in S604), the controller 130 performs continuous shooting processing at a pre-set continuous shooting speed by controlling various units until the pressing of the still image release button 201 is canceled (S606). Specifically, the imaging control unit 130a causes the CCD image sensor 120 to perform continuous shooting in accordance with information indicating the value of the continuous shooting speed stored in the buffer memory 124. As the continuous shooting imaging operation, the CCD image sensor 120 continues to output image information for still images at the continuous shooting speed stored in the buffer memory 124 until the pressing of the still image release button 201 is canceled. The series of image information is subjected to various types of processing, and thereafter the image information for each image is recorded on the memory card 140 in an image file format by the recording unit 130c. The filename of the image file is assigned by the recording unit 130c. Also, when continuous shooting is started, the recording unit 130c determines the continuous shooting ID that is to be assigned to the series of recorded image information to be recorded in the continuous shooting processing. The recording unit 130c assigns information indicating the determined continuous shooting ID and the continuous shooting speed setting to the recorded image information as tag information. Thereafter, the grouping determination unit 130b updates the content management list 142a (S607). When updating the content management list 142a after continuous shooting, the grouping determination unit 130b performs the following processing.

1) The grouping determination unit 130b adds a plurality of entries for the recorded images obtained by continuous shooting to the end of the content management list 142a. The filenames of the image files of the recorded images are respectively set in the "filename" fields of these entries. Based on the tag information of the recorded image information, continuous shooting IDs and continuous shooting speeds are set in the "continuous shooting ID" and "continuous shooting speed" fields of these entries.

2) Furthermore, if the continuous shooting speed is "continuous shooting (high-speed)", the grouping determination unit 130b sets the filename of the image file of the first recorded image among the series of recorded images in the "first filename" field of the entry corresponding to the first recorded image, and sets "ON" in the "grouping flag" field of the same entry. Moreover, the grouping determination unit 130*b* causes the "first filename" field of the entries corresponding to the recorded images other than the first one among the series of recorded images to be blank, and sets "OFF" in the "grouping flag" field of these entries.

3) If the continuous shooting speed is not "continuous shooting (high-speed)", the grouping determination unit 130*b* sets the filenames of the image files of the series of recorded images obtained by the immediately previous continuous shooting in the "first filename" field of the entries corresponding to the series of recorded images, and sets "OFF" in the "grouping flag" field of the same entries.

As described above, information for grouping together recorded image information that was recorded when the continuous shooting setting was "continuous shooting (high-speed)" can be managed with use of the "first filename" field, the "grouping flag" field, and the like in the content management list 142*a*.

From a different point of view, in the above-described processes (2) and (3) of the processing for updating the content management list 142*a*, the grouping determination unit 130*b* determines whether a series of image information obtained in one continuous shooting is to be grouped together based on information indicating the value of the continuous shooting speed. Also, information indicating the result of the determination made by the grouping determination unit 130*b* is stored in the content management list 142*a*.

If the continuous shooting speed is a relatively low speed, the number of images captured in one continuous shooting can be thought to often be relatively low. Accordingly, even if all the images in a series of images captured by relatively low-speed continuous shooting are displayed in order on the liquid crystal monitor 123 during the reproduction of recorded images, there is a high possibility that there will be little decrease in the viewability of all the recorded images on the memory card 140. In view of this, in the present embodiment, a series of images captured by continuous shooting at a continuous shooting speed other than "continuous shooting (high-speed)" are not grouped together. On the other hand, if the continuous shooting speed is a relatively high speed, the number of images captured in one continuous shooting can be thought to often be relatively high. Accordingly, in the present embodiment, a series of images captured by continuous shooting at the continuous shooting speed "continuous shooting (high-speed)" are grouped together. As a result, it is possible to improve the viewsability of all recorded images on the memory card 140.

Also, if the continuous shooting speed is a relatively high speed, there is a high possibility that a series of images captured in one continuous shooting are mutually similar images. Accordingly, there is a high possibility that from the viewpoint of the user, it is sufficient for only a representative image among a series of images captured by relatively high-speed continuous shooting to be displayed on the liquid crystal monitor 123. On the other hand, if the continuous shooting speed is a relatively low speed, there is a low possibility that a series of images captured in one continuous shooting are mutually similar images. Accordingly, there is a high possibility that the user will desire for all the images in the series of images captured by relatively low-speed continuous shooting to be displayed in order on the liquid crystal monitor 123. From this point of view as well, in the present embodiment, a series of images captured by continuous shooting at a continuous shooting speed other than "continuous shooting (high-speed)" are not grouped together, and a series of images captured by continuous shooting at the continuous shooting speed "continuous shooting (high-speed)" are grouped together.

2-4. Operations in Reproduction

The following is a description of operations performed by the digital camera 100 in reproduction. If the user presses the mode switching switch 207 in the reproduction mode direction while the power of the digital camera 100 is on, the controller 130 switches the state of the digital camera 100 to the reproduction mode by controlling various units therein, and reproduces recorded images by group display. The screen displayed by the liquid crystal monitor 123 immediately after the switch to the reproduction mode is a screen displaying a recorded image indicated by the reproduction content information. Based on the content management list 142*a*, the display control unit 130*d* causes the liquid crystal monitor 123 to display, as appropriate in a grouped manner, a series of still images based on a series of recorded image information captured in one continuous shooting.

Figure 7:
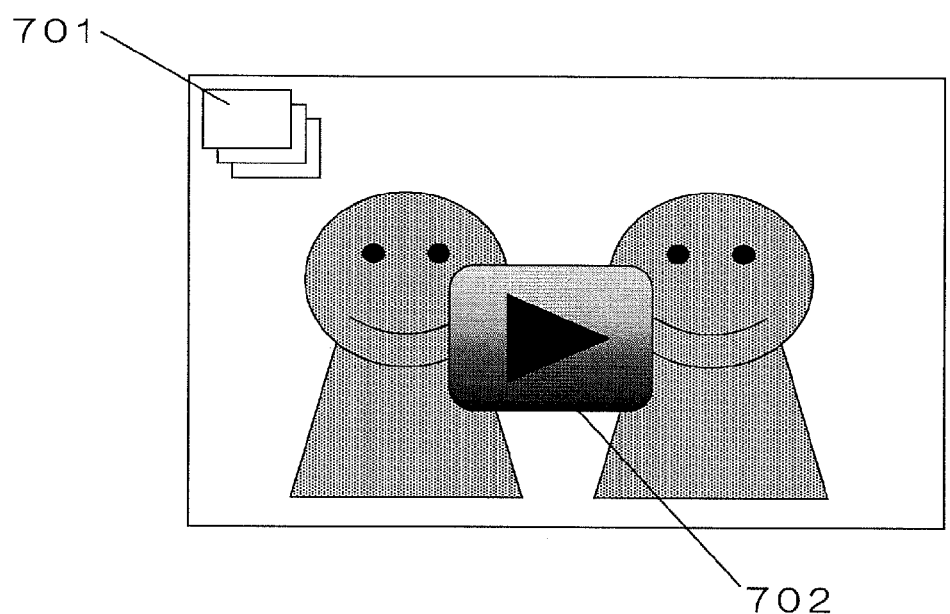
FIG. 7 shows an example of a display screen in a reproduction mode of the digital camera 100 according to Embodiment 1.

Specifically, the display control unit 130*d* reads out from the content management list 142*a* a value in the "grouping flag" field of the entry corresponding to the recorded image indicated by the current reproduction content information. If the value of the "grouping flag" is "ON", the display control unit 130*d* reads out the recorded image indicated by the current reproduction content information from the memory card 140, and causes the liquid crystal monitor 123 to display the readout recorded image. Meanwhile, also in the case where the value of the "grouping flag" is "OFF", the display control unit 130*d* reads out the recorded image indicated by the current reproduction content information from the memory card 140, and causes the liquid crystal monitor 123 to display the readout recorded image. Also, if the value of the "grouping flag" is "ON", the display control unit 130*d* causes the liquid crystal monitor 123 to display an icon 701 and the recorded image at the same time. The icon 701 is information indicating that the recorded image indicated by the current reproduction content information is grouped together with other images. Furthermore, the display control unit 130*d* may cause an icon 702 to be displayed together with the recorded image and the icon 701 as shown in FIG. 7. The icon 702 has such a form that the user is given the impression that a grouped series of recorded images can be reproduced consecutively or individually. In the present embodiment, when the user instructs the cancellation of reproduction by group display by operating the operation unit 150 while the icons 701 and 702 are displayed, the display control unit 130*d* consecutively or individually reproduces the recorded images belonging to the same group as the currently displayed image, one-by-one from the first image of the group.

If the user operates the operation unit 150 to instruct the display of the next recorded image in the state in which reproduction by group display is instructed, the display control unit 130*d* reads out the value of the "first filename" field of the next entry included in the content management list 142*a*. If no filename is stored in the "first filename" field, the display control unit 130*d* then reads out the value of the "first filename" field of the following entry. The display control unit 130*d* then causes the liquid crystal monitor 123 to display the recorded image specified by the readout filename. Furthermore, if the value of the "grouping flag" field of the same entry is "ON", the display control unit 130*d* causes the liquid crystal monitor 123 to display the icon 701 and the icon 702 together with the recorded image.

If the user operates the operation unit 150 while the image corresponding to the entry whose "grouping flag" field has a value of "ON" is displayed, to instruct to consecutively or individually reproduce other images belonging to the same group as that currently displayed image, these other images are displayed one-by-one. In this case, the display control unit 130d causes the liquid crystal monitor 123 to display only images to which the same continuous shooting ID as the currently displayed image is assigned.

Other Embodiments

3.

The present invention is not intended to be limited to the embodiment described above, and various other embodiments are possible. The following is a description of the other embodiments of the present invention.

3-1.

Although the image processing unit 122 and the controller 130 have been described as having the above-described functions and configurations in the above embodiment, a configuration is possible in which at least part of the functions and configuration of one is included in the other.

3-2.

Although the use of the CCD image sensor 120 as an imaging element has been described in the above embodiment, the imaging element is not limited to this. For example, in the present invention, it is possible to use another imaging element in place of the CCD image sensor 120, such as a CMOS image sensor or an NMOS image sensor. Also, a touch panel may be disposed on the liquid crystal monitor 123 in place of or in addition to the still image release button 201. In other words, the method by which the digital camera 100 receives an instruction to capture a still image from the user is not limited to operation of the still image release button 201, and another method may be used.

3-3.

In the above embodiment, settings regarding the aperture, exposure correction, white balance, zooming, and the like are described as not being changed when performing continuous shooting. However, continuous shooting can be said to be processing in which the operation for capturing one recorded image is performed a plurality of times consecutively in response to one operation performed by the user. Accordingly, the present invention may be applied to, for example, so-called bracket imaging in which settings regarding the aperture, exposure correction, white balance, zooming, and the like are changed when performing continuous shooting. In bracket imaging, the number of images captured in one continuous shooting is determined in advance. In this case, it is possible to start continuous shooting when the pressing of the still image release button 201 has started, and end continuous shooting when a predetermined number of recorded images have been obtained, regardless of the pressed condition of the still image release button 201.

3-4.

In the above embodiment, the description is given in which the user selects "low-speed", "medium-speed", or "high-speed" as the continuous shooting speed setting. However, the controller 130 may automatically select the continuous shooting speed according to a selection reference. One example of the selection reference is an amount of change between through-the-lens images that have been captured. Specifically, a configuration is possible in which the controller 130 increases the continuous shooting speed as the amount of change between through-the-lens images increases (movement of the subject becomes faster). In this case, the controller 130 assigns the selected continuous shooting speed to the recorded image information as tag information. Here, there is the possibility that different continuous shooting speeds will be assigned to recorded images recorded in one continuous shooting. In view of this, a configuration is possible in which, in the content management list creation processing, whether grouping is to be performed is determined based on the average value, maximum value, minimum value, or the like of the continuous shooting speeds assigned to a series of recorded image information captured in one continuous shooting. Also, whether grouping is to be performed may be determined based on only the continuous shooting speed of the first image among a series of recorded images.

3-5.

In the above embodiment, recorded images obtained by continuous shooting are grouped only if the continuous shooting speed is "high-speed". However, a configuration is possible in which recorded images obtained by continuous shooting are grouped only if the continuous shooting speed is greater than or equal to a predetermined threshold value. For example, a configuration is possible in which recorded images obtained by continuous shooting are grouped only if the continuous shooting speed is greater than or equal to "medium-speed". The same applies even if the continuous shooting setting is expressed differently or set using a different method. For example, the continuous shooting speed may be set by the designation of a specific continuous shooting speed or continuous shooting interval, and in any case, it is sufficient for recorded images obtained by continuous shooting to be grouped if the continuous shooting speed is greater than or equal to a predetermined threshold value. Also, the continuous shooting speed threshold value for determining whether grouping is to be performed may be determined automatically within the digital camera 100, or may be determined manually according to a value input by the user.

3-6.

In the above embodiment, in the case of capturing image information, information related to continuous shooting such as the continuous shooting speed are associated with the corresponding image information and recorded as tag information, and whether image information are to be grouped is determined based on the tag information. However, a configuration is possible in which instead of information related to continuous shooting being recorded as tag information, the content management list 142a is updated according to the continuous shooting setting each time imaging (single shooting or continuous shooting) is performed.

3-7.

In the above embodiment, if the user inserts the memory card 140 into the digital camera 100 while the power is on, or if the user turns the power on by pressing the power button 203 while the memory card 140 is inserted in the digital camera 100, the digital camera 100 performs content management list creation processing. However, a configuration is possible in which, if it has been detected that the same memory card 140 as during the previous operation is inserted when the power is turned on, the content management list 142a that was used during the previous operation continues to be used instead of a new content management list 142a being created. Also, the content management list creation processing may be automatically started when the memory card 140 is inserted, even if the power of the digital camera 100 is not on.

3-8.

In the above embodiment, information related to whether grouping is to be performed is described as being managed by the content management list 142a that is separate from the recorded image information. However, a configuration is possible in which whether a recorded image is to be grouped is set in the image file of each recorded image. In this case, it is sufficient for information corresponding to the "first filename" field, the "grouping flag" field, and the like to be recorded as tag information of the image files of the recorded images.

3-9.

In the above embodiment, whether grouping is to be performed is determined based on information indicating the continuous shooting speed. However, the control parameter related to continuous shooting as the reference for determining whether grouping is to be performed is not limited to the continuous shooting speed, and may be another control parameter related to continuous shooting.

For example, the control parameter related to continuous shooting as the reference for determining whether grouping is to be performed may be a control parameter that is dependent on the continuous shooting speed, instead of being the continuous shooting speed itself. Examples of a control parameter that is dependent on the continuous shooting speed include the type of the shutter 114 (whether imaging was performed using electronic shuttering or mechanical shuttering), which influences the continuous shooting speed, and whether pixel mixing processing was performed. In general, in the case where electronic shuttering is used, and in the case where pixel mixing processing is executed, the speed at which charge is read out from the pixels of the imaging element increases, thus enabling the realization of continuous shooting at a high continuous shooting speed. Accordingly, in an imaging device in which the continuous shooting speed is automatically set to high-speed in the case of a setting according to which electronic shuttering is used, whether grouping is to be performed may be determined based on the type of the shutter 114. The same applies with an imaging device in which the continuous shooting speed is automatically set to high-speed in the case of a setting according to which pixel mixing processing is executed.

Alternatively, the control parameter related to continuous shooting as the reference for determining whether grouping is to be performed may be, for example, the number of images captured in one continuous shooting, or a control parameter that is dependent on the number of images captured in one continuous shooting. The number of images captured in one continuous shooting refers to the number of images in a series of images obtained in one continuous shooting. One example of a control parameter that is dependent on the number of images captured in one continuous shooting is the continuous shooting time (the time from the start to the end of one continuous shooting). The continuous shooting time is determined based on, for example, the length of time from when the still image release button is pressed to start continuous shooting until when the pressing is canceled to stop continuous shooting. In this case, it is preferable that recorded images obtained by continuous shooting are grouped if the number of images captured in continuous shooting is greater than or equal to a predetermined value.

3-10.

The control parameter related to continuous shooting as the reference for determining whether grouping is to be performed is not limited to being able to be directly set by the user as in the above embodiment, and may be able to be set indirectly. A control parameter that can be set indirectly is a control parameter that is determined in conjunction with the value of another control parameter that the user directly sets. Examples include the above-described type of the shutter 114 and the whether pixel mixing processing is executed. Alternatively, the control parameter related to continuous shooting as the reference for determining whether grouping is to be performed may be a control parameter that is automatically set in accordance with a condition not set by the user. One example is the above-described amount of change between through-the-lens images.

3-11.

In the above embodiment, whether grouping is to be performed is determined based on the value of one control parameter related to continuous shooting. However, whether grouping is to be performed may be determined based on a combination of the values of a plurality of control parameters related to continuous shooting.

3-12.

In the above embodiment, only the first image in a series of grouped images is displayed as a representative image. However, an image other than the first image in a series of grouped images may be displayed as a representative image. Also, there is no limitation to displaying one representative image from a series of grouped images, and a plurality of images may be displayed as representative images.

INDUSTRIAL APPLICABILITY

The technology disclosed herein enables improving user-convenience in the management of image information of a series of still images captured by continuous shooting, and therefore is applicable to an imaging device that can perform continuous shooting, such as a digital still camera, a movie camera, or a mobile phone.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of an imaging device. Accordingly, these terms, as utilized to describe the present invention should be interpreted relative to an imaging device.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An imaging device configured to perform continuous shooting, comprising:
    an imaging unit configured to capture an image of a subject;
    a memory configured to store a content management list, the content management list including continuous shooting control information indicating a value of a control parameter related to continuous shooting;
    an imaging control unit configured to cause the imaging unit to perform continuous shooting in accordance with the stored continuous shooting control information;
    a recording unit configured to record a series of image information on a storage device;
    a display unit;
    a grouping determination unit configured to:
        generate the content management list, and
        determine, based on the stored continuous shooting control information, whether the series of image information is to be grouped together, the series of image information being obtained in one continuous shooting; and
    a display control unit configured to group a series of still images based on the series of image information recorded on the storage device according to the result of the determination of the grouping determination unit, and configured to cause the display unit to display the series of still images grouped;
    wherein the continuous shooting control information includes information indicating a continuous shooting speed, and
    the grouping determination unit is further configured to:
        determine that the series of image information are to be grouped together based on the content management list when the content management list indicates that the continuous shooting speed was set to high during image capture, and
        determine that the series of image information are not to be grouped together based on the content management list when the content management list indicates that the continuous shooting speed was not set to high during image capture.

2. The imaging device according to claim 1, wherein:
    the continuous shooting control information includes information indicating a value of a control parameter that is dependent on the continuous shooting speed.

3. The imaging device according to claim 1, wherein:
    the continuous shooting control information includes at least one of information indicating a number of images captured in one continuous shooting and information indicating a value of a control parameter that is dependent on the number of images captured in one continuous shooting.

4. The imaging device according to claim 1, wherein:
    the display control unit is further configured to cause the display unit to display the series of still images based on the series of image information recorded on the storage device, at least one but not all of the images among the series of still images being displayed as a representative image when the grouping determination unit has determined that the series of image information are to be grouped together.

5. An imaging device configured to perform continuous shooting, comprising:
    an imaging unit configured to capture an image of a subject;
    an imaging control unit configured to cause the imaging unit to perform continuous shooting;
    a recording unit configured to record a series of image information captured by the imaging unit in a memory, the memory configured to store a plurality of image information and a content management list, the content management list including a plurality of continuous shooting control information;
    a grouping determination unit configured to:
        generate the content management list, and
        determine whether the series of image information is to be grouped together based on the stored continuous shooting control information;
    a display unit; and
    a display control unit configured to cause the display unit to display the series of still images grouped according to the determination of the grouping determination unit;
    wherein the continuous shooting control information includes information indicating a continuous shooting speed and is stored with each respective image information captured by the imaging unit in the memory, and
    the grouping determination unit is further configured to:
        determine that the series of image information are to be grouped together based on the content management list when the content management list indicates that the continuous shooting speed was set to high during image capture, and
        determine that the series of image information are not to be grouped together based on the content management list when the content management list indicates that the continuous shooting speed was not set to high during image capture.

6. The imaging device according to claim 5, wherein:
    the grouping determination unit is further configured to output grouping information;
    the grouping information related to each respective image information captured by the imaging unit, and based on each respective continuous shooting control information; and
    the memory is further configured to store the grouping information with each respective image information captured by the imaging unit.

7. The imaging device according to claim 6, wherein:
    the grouping information includes a grouping flag.

8. The imaging device according to claim 6, wherein:
    the grouping information includes information related to a first image of the series of image information captured by the imaging unit while performing continuous shooting.

9. The imaging device according to claim 6, wherein:
    the memory is further configured to store the grouping information and the continuous shooting control information in a content management list,
    the content management list including grouping information and control information related to each image information stored on the memory captured by the imaging unit.

10. The imaging device according to claim 1, wherein:
the continuous shooting control information further includes grouping flag data; and
the display control unit is further configured to display a representative image from a grouped series of still images with an indicator that indicates that the representative image is representative of the grouped series of still images.

\* \* \* \* \*